United States Patent
Hanamura

[11] Patent Number: 5,928,766
[45] Date of Patent: Jul. 27, 1999

[54] CHIP-TYPE COMPOSITE PART

[75] Inventor: Toshihiro Hanamura, Kyoto, Japan

[73] Assignee: Rohm Co., Ltd., Kyoto, Japan

[21] Appl. No.: 08/106,144

[22] Filed: Aug. 13, 1993

Related U.S. Application Data

[63] Continuation of application No. 07/982,848, Nov. 30, 1992, abandoned.

[30] Foreign Application Priority Data

Nov. 28, 1991 [JP] Japan .................................. 3-312961

[51] Int. Cl.[6] ............................................. B32B 3/00
[52] U.S. Cl. ........................ 428/209; 428/210; 428/901; 428/68; 428/201; 361/738; 361/782; 361/811
[58] Field of Search .................... 428/688, 689, 428/699, 701, 702, 209, 210, 68, 201, 901; 361/738, 782, 811

[56] References Cited

U.S. PATENT DOCUMENTS 4,020,222  4/1977  Kausche et al. ........................ 428/209
4,490,429  12/1984  Tosaki et al. ........................... 428/210

OTHER PUBLICATIONS

Sinnadurai, "Handbook of Microelec. Packaging and Interconnection Tech.," 1985, Electrochem. Publ., pp. 30–35, 92–95.

Towers, "Hybrid Microcircuits" Pentech Press, 1979, pp. 8–11, 76–79.

*Primary Examiner*—Marie Yamnitzky
*Attorney, Agent, or Firm*—Baker & Botts, L.L.P.

[57] ABSTRACT

On the front surface of an insulating substrate, there are formed first and second terminal electrodes at one end portion of the substrate, a third terminal electrode at the other end portion, a resistor portion connected to the first and second terminal electrodes, and a capacitor portion connected to the second and third terminal electrodes. The capacitor portion has a multilayer structure consisting of a bottom electrode, dielectric layer and a top electrode.

6 Claims, 3 Drawing Sheets

5,928,766

CHIP-TYPE COMPOSITE PART

This application is a continuation of application Ser. No. 07/982,848, filed on Nov. 30, 1992 (now abandoned).

BACKGROUND OF THE INVENTION

The present invention relates to a chip-type composite part in which passive elements (a capacitor, resistor, inductor, etc.) are formed on a single substrate.

As is well known, in a composite part, passive elements such as a capacitor, resistor, inductor, etc. are combined and arranged on an insulating substrate to produce a compact part. In general, a capacitor-resistor combination and a capacitor-inductor combination are very common, and a resistor-inductor combination is rare. Among those combinations, the capacitor-resistor combination, called a CR composite part, is most commonly used.

FIG. 6 (sectional view) and FIG. 7 (perspective view showing an appearance) illustrate a structure of an example of the CR composite part. In this CR composite part, a resistor portion R and a capacitor portion C are formed on the front surface and the back surface of an insulating substrate 30, respectively. The resistor portion R is constituted of a pair of resistor electrodes 31, 32, a resistor layer 33 that is formed so as to connect the electrodes 31 and 32, and an overcoat layer 34 to cover the resistor layer 33.

On the other hand, the capacitor portion C is formed by sequentially laying a bottom capacitor electrode 35, a dielectric layer 36 and a top capacitor electrode 37, and then covering these layers by an overcoat layer 38.

Further, an outer electrode 39 for electrically connecting the resistor electrode 31 and the top capacitor electrode 37 and another outer electrode 40 for electrically connecting the resistor electrode 32 and the bottom capacitor electrode 35 are formed on end faces of the insulating substrate 30.

This type of composite part is generally produced such that the resistor portion R and the capacitor portion C are formed, by printing and firing, on the respective surfaces (i.e., front and back surfaces) of the insulating substrate 30. Therefore, it is difficult to control the quality of this type of composite part because cracks etc. are likely to occur in the latter-formed passive element (resistor portion R or capacitor portion C). In addition, since passive elements are formed on both surfaces of the insulating substrate 30, neither surfaces of the composite part are flat, which results in inferior mounting efficiency. Further, since both surfaces need to be protected, the composite parts cannot be laid one on another without using some jigs etc. This is a problem in handling the composite parts.

FIG. 8 shows another type of CR composite part in which a resistor portion R and a capacitor portion C are formed in series on an insulating substrate 50. FIG. 9 shows an equivalent circuit thereof.

Since in this type of CR composite part the resistor portion R and the capacitor portion C cannot be measured separately after the formation of the passive elements, an impedance decomposition technique (decomposition of the resistance and capacitance components) is needed. This will need a long measurement time, so that the productivity is reduced.

SUMMARY OF THE INVENTION

The present invention has been made in view of the above circumstances in the art, and has an object of providing a chip-type composite part which is superior in stability of quality, mounting efficiency and handling, and in which a separate measurement of individual passive elements can be performed easily to increase productivity.

According to the invention, a chip-type composite part comprises:

an insulating substrate;

first and second terminal electrodes formed at a first end portion of the insulating substrate;

a third terminal electrode formed at a second end portion of the insulating substrate;

a first passive element formed on the insulating substrate, two respective terminals thereof being connected to the first and second terminal electrodes; and a second passive element formed on the insulating substrate, two respective terminals thereof being connected to the second and third terminal electrodes;

wherein the first, second and third terminal electrodes and the first and second passive elements are formed on one surface of the insulating substrate.

DESCRIPTION OF THE PREFERRED EMBODIMENTS

A chip-type composite part according to the present invention is described hereinafter by way of embodiments. In these embodiments, all of the materials and processing conditions are conventional and are well-known to those skilled in the art.

Figure 1:
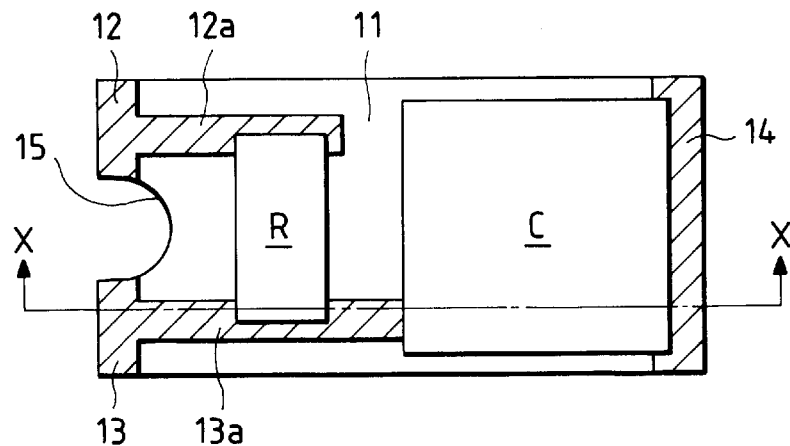
FIG. 1 is a plan view of a CR composite part according to an embodiment of the present invention.
Figure 2:
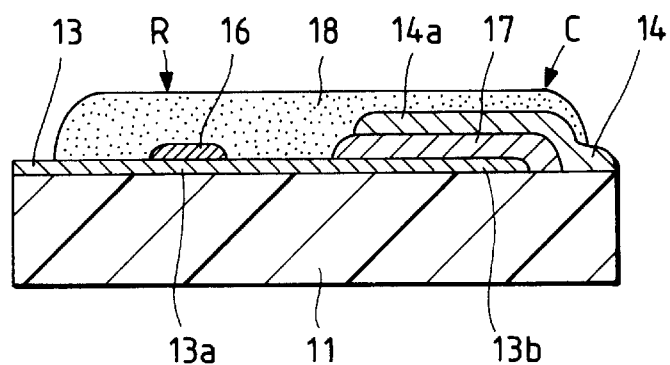
FIG. 2 is a sectional view taken along line X—X in FIG. 1.

FIG. 1 is a plan view of a CR composite part according to an embodiment which has a capacitor portion C and a resistor portion R. FIG. 2 is a sectional view taken along line X—X in FIG. 1. In this CR composite part, a first electrode 12 and a second electrode 13 are provided at the left end portion (in FIG. 1) of a surface of an insulating substrate 11 made of, e.g., ceramics, and a third electrode 14 is provided at the right end portion of the same surface. A cut portion 15 is formed at the left end portion. The first and second electrodes 12, 13 extend along the left end line of the insulating substrate 11 to the cut portion 15, and serve as respective terminal electrodes of the left side. Further, the first electrode 12 has a strip-like electrode 12a that extends in the longitudinal direction to the vicinity of the center of the insulating substrate 11. Similarly, the second electrode 13 has a strip-like electrode 13a that extends longitudinally past the vicinity of the center of the insulating substrate 11 and is integral with a rectangular electrode 13b (see FIG. 2) existing at the capacitor portion C. The third electrode 14 has a portion that extends along the right end line of the insulating substrate 11 and serves as a terminal electrode of the right side. The third electrode 14 also has a rectangular electrode 14a existing at the capacitor portion C (see FIG. 2).

On the surface of the insulating substrate 11 on which the above electrode pattern is formed, the resistor portion R is connected to the first and second electrodes 12, 13 and the capacitor portion C is connected to the second and third electrodes 13, 14. As shown in FIG. 2, the resistor portion R consists of the first electrode 12 (strip-like electrode 12a), the second electrode 13 (strip-like electrode 13a) and a resistor 16 layer that is partially laid on the electrodes 12a, 13a. The capacitor portion C is constituted by sequentially laying the rectangular electrode 13b, a dielectric layer 17 and the rectangular electrode 14a. The rectangular electrode 13b of the second electrode 13 serves as a bottom capacitor electrode, and the rectangular electrode 14a of the third electrode 14 serves as a top capacitor electrode.

The electrodes 12–14, the resistor portion R and the capacitor portion C are covered with an overcoat layer 18 except for the portions of the electrodes 12–14 extending along the end lines, which portions (exposed portions) serve as three terminal electrodes.

Figure 3:
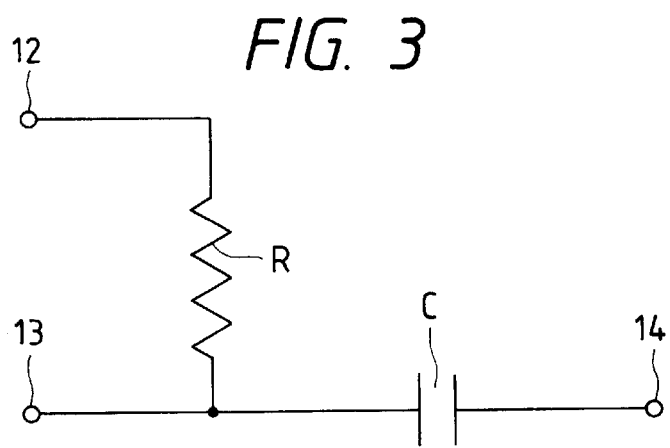
FIG. 3 shows an equivalent circuit of the CR composite part of FIG. 1.

As is understood from FIG. 3 showing an equivalent circuit of the above CR composite part, the resistor portion R and the capacitor portion C are connected in series. There exist three terminal electrodes 12–14, and the resistor portion R has two of them. A resistance etc. of the resistor portion R can be measured using the terminal electrodes 12, 13, and a capacitance etc. of the capacitor portion C can be measured using the terminal electrodes 13, 14. That is, the resistor portion R and the capacitor portion C can be measured separately.

Figure 4:
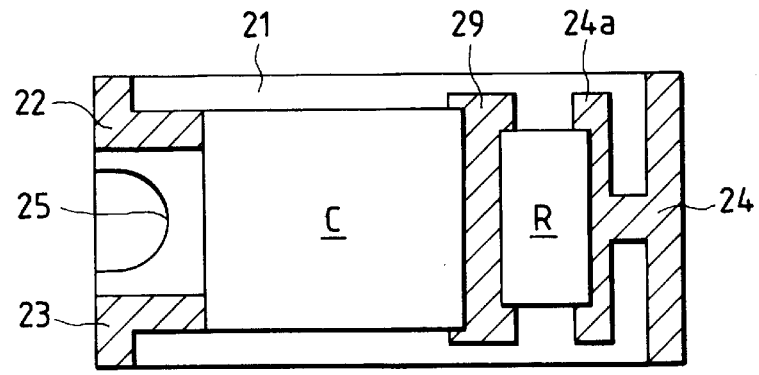
FIG. 4 is a plan view of a CR composite part according to another embodiment of the invention.

FIG. 4 is a plan view showing a CR composite part according to another embodiment. In this CR composite part, a capacitor portion C is formed on the side of a first electrode 22 and a second electrode 23 that are provided at the left end portion (in FIG. 4) of an insulating substrate 21. A resistor portion R is formed on the side of a third electrode 24 that is provided at the right end portion of the insulating substrate 21. While the first and second electrodes 22, 23 are separated from each other as terminal electrodes at the left side of the insulating substrate 21, they are integral with a rectangular electrode (bottom capacitor electrode) and another rectangular electrode (top capacitor electrode), respectively, of the capacitor portion C. The third electrode 24 has, in addition to a portion extending along the right end line and serving as a terminal electrode, a strip-like portion 24a extending in the transverse direction and connected to the resistor portion R. The capacitor portion C and the resistor portion R are connected via a fourth electrode 29. That is, the fourth electrode 29 is integral with another rectangular electrode (top capacitor electrode) of the capacitor portion C.

Figure 5:
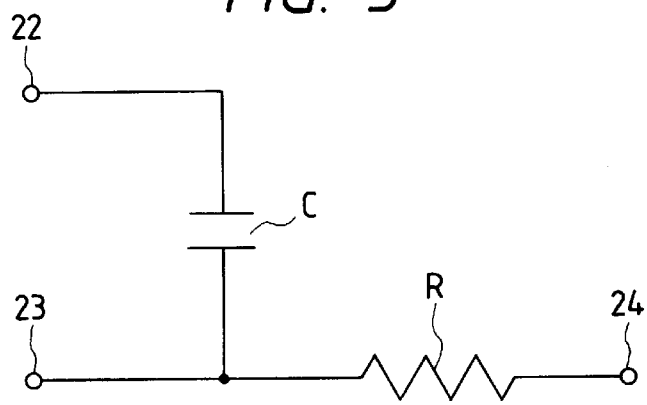
FIG. 5 is an equivalent circuit of the CR composite part of FIG. 4.
Figure 6:
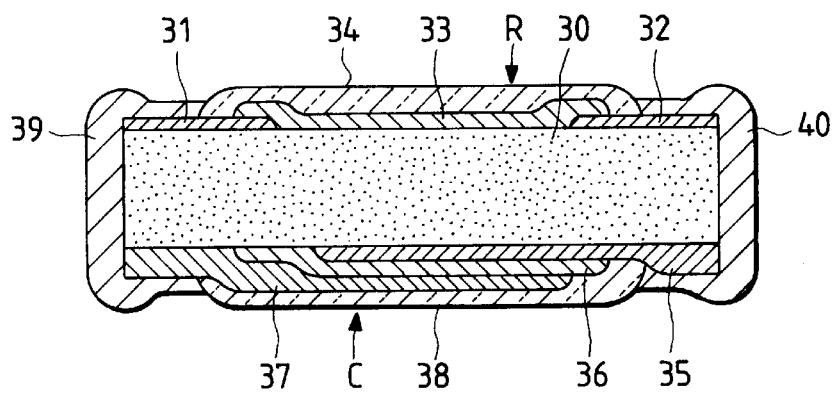
FIG. 6 is a longitudinal sectional view of a conventional CR composite part.
Figure 7:
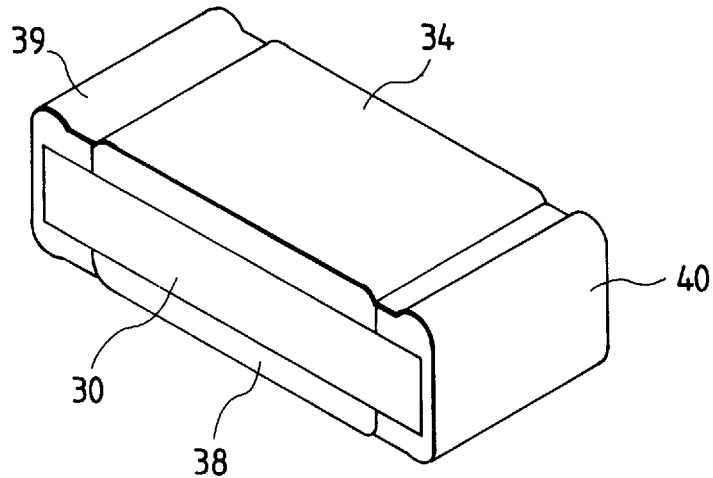
FIG. 7 is a perspective view of the CR composite part of FIG. 6.
Figure 8:
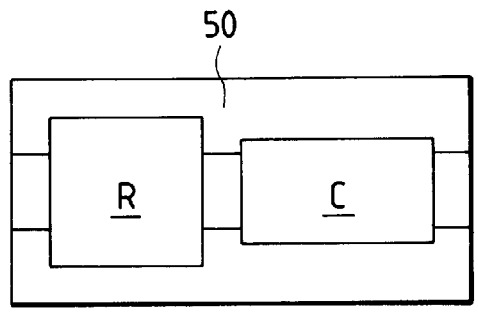
FIG. 8 is a plan view of another conventional CR composite part.
Figure 9:
FIG. 9 is an equivalent circuit of the CR composite part of FIG. 8.

As in the case of the first embodiment, the capacitor portion C has a multilayer structure consisting of the bottom capacitor electrode, dielectric layer and top capacitor electrode, and the resistor portion R includes a resistor layer. FIG. 5 is an equivalent circuit of this CR composite part. While the capacitor portion C and the resistor portion R are connected in series as in the case of the first embodiment, the two terminal electrodes are connected to the capacitor portion C. Therefore, the capacitor portion C is measured using the terminal electrodes 22, 23, and the resistor portion R is measured using the terminal electrodes 23, 24.

In the composite part of the invention, the passive elements to be formed on the surface of the insulating substrate include a resistor, capacitor, inductor, etc. CR composite parts and CL composite parts are produced by combining those passive elements. Using the conventional inductor structure, the resistor R in each of the CR composite parts of FIGS. 3 and 5 is replaced by an inductor to form an CL composite part of the invention.

As described above, in the chip-type composite part of the invention, all passive elements are formed on the front surface of an insulating substrate. Two terminal electrodes are provided at one end and one terminal electrode is provided at the other end of the insulating substrate; that is, three electrodes are provided in total. With this structure, the invention can provide the following advantages:

(1) By virtue of the existence of three terminal electrodes, the passive elements can be measured separately, which will improve the productivity.

(2) Since all the passive elements are provided on the front surface of the insulating substrate, the back surface of the substrate is flat, so that the composite part of the invention is superior in stability of quality (reliability), mounting efficiency and handling.

(3) By virtue of the structure in which two terminal electrodes are provided on one side and one terminal electrode on the other side, the orientation of the composite part can easily be recognized visually, which will prevent mounting errors etc.

(4) The existence of three terminal electrodes will expand the use of the composite part and make them more suitable for general purposes.

What is claimed is:

1. A composite electric circuit part comprising:

an insulating substrate;

first and second terminal electrodes formed so as to be externally engageable at a first end edge portion of the insulating substrate;

a third terminal electrode formed so as to be externally engageable at a second end edge portion of the insulating substrate;

a first passive element formed on the insulating substrate, two respective terminals thereof being connected directly to the first and second terminal electrodes; and a second passive element formed on the insulating substrate, two respective terminals thereof being connected directly to the second and third terminal electrodes;

wherein the first, second and third terminal electrodes and the first and second passive elements are formed on one surface of the insulating substrate.

2. The composite part of claim 1, wherein the first passive element is a resistor including a resistor layer, and the second passive element is a capacitor having a multilayer structure including a bottom electrode, a dielectric layer and a top electrode.

3. The composite part of claim 1, wherein the first passive element is a capacitor having a multilayer structure including a bottom electrode, a dielectric layer and a top electrode, and the second passive element is a resistor including a resistor layer.

4. The composite part of claim 1, wherein the first passive element is an inductor, and the second passive element is a capacitor having a multilayer structure including a bottom electrode, a dielectric layer and a top electrode.

5. The composite part of claim 1, wherein the first passive element is a capacitor having a multilayer structure including a bottom electrode, a dielectric layer and a top electrode, and the second passive element is an inductor.

6. The composite part of claim 1, further comprising an overcoat layer entirely covering the first and second passive elements, and partially covering each of the first, second and third terminal electrodes.

* * * * *